Sept. 29, 1959  J. J. SABATINI  2,906,382
DENTAL TYPE OF OVER-RUNNING CLUTCH AND
CONTROL MECHANISM THEREFOR
Filed Jan. 23, 1957
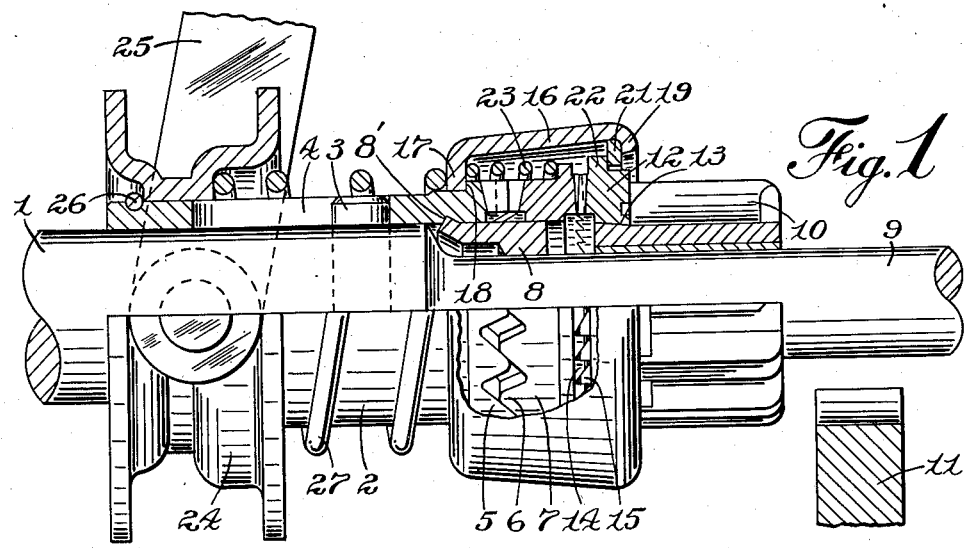
Fig. 1
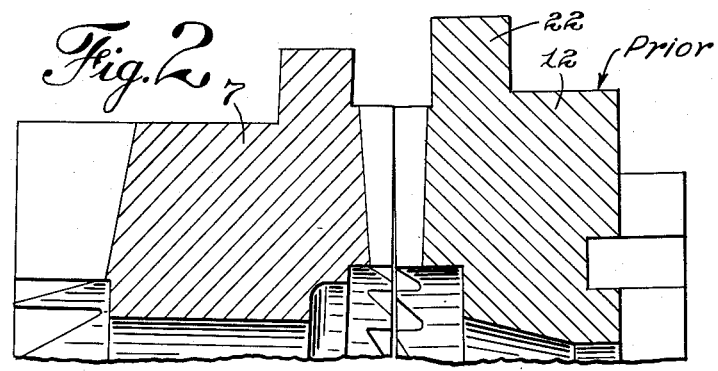
Fig. 2
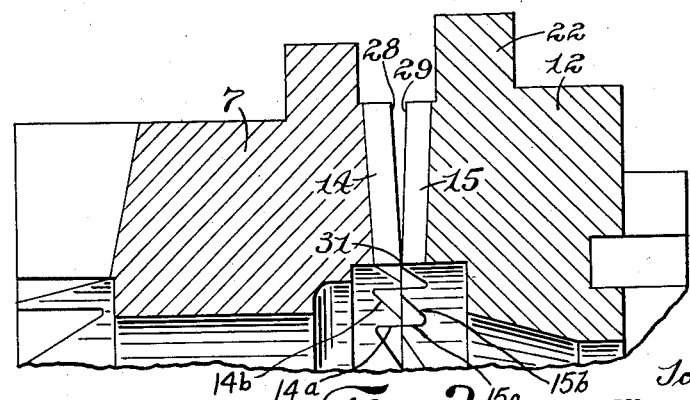
Fig. 3
Fig. 4
WITNESS:
Esther M. Stockton
INVENTOR.
John J. Sabatini
BY
Clinton L. James
ATTORNEY United States Patent Office 2,906,382
Patented Sept. 29, 1959

2,906,382

DENTAL TYPE OF OVER-RUNNING CLUTCH AND CONTROL MECHANISM THEREFOR

John Joseph Sabatini, Horseheads, N.Y., assignor to Bendix Aviation Corporation, Elmira Heights, N.Y., a corporation of Delaware Application January 23, 1957, Serial No. 635,684

2 Claims. (Cl. 192—41)

The present invention relates to a dental type of overrunning clutch and control mechanism therefor, and more particularly to the incorporation of such a clutch in engine starter gearing of that type which comprises an overrunning clutch to prevent the engine from driving the starting motor when the engine becomes self-operative.

In starter gearing of this type such as disclosed for instance in the patent to Miller 2,782,643, issued February 26, 1957, it has been found that the overrunning action of the dental clutch is sometimes objectionably noisy, and various means have been devised to reduce the noise by holding the clutch members apart while overrunning. In such arrangements heretofore proposed, however, there is a hazard that reengagement of the clutch in case of a false start may not take place until the engine gear and pinion have slowed down to a speed substantially lower than that of the starting motor, so that the resumption of cranking causes the parts to be subjected to undesirable shock loads.

In the study of the overrunning action of starter gearing such as shown by Miller cited, examination of high speed motion films has shown that the harsh noise sometimes occurring during overrunning is caused by the driving clutch ring (No. 12 in the Miller disclosure) becoming slightly cocked or misaligned on its bearing, and the plane of rotation of its dentals skewed with respect to that of the pinion dentals. This causes momentary point engagement of the clutch teeth at the outer peripheries of the members which sets up a violent chattering action as the driving clutch ring is thus vibrated to the extent of its freedom on its bearing.

It is an object of the present invention to reduce or eliminate this objectionable chattering action of the dental overrunning clutch with its accompanying noise and attrition of the parts, without the necessity of holding them apart, and without decreasing the necessary clearances and tolerances of the parts, or undesirably increasing their axial dimensions.

Further objects and advantages will be apparent from the following description taken in connection with the accompanying drawing in which:

Fig. 1 is a side elevation, partly broken away and in section, of a preferred embodiment of the invention;

Fig. 2 is an enlarged detail in section of the overrunning clutch members of the transmission shown in the conventional form, and in the relative positions assumed during overrunning;

Fig. 3 is a view similar to Fig. 2, showing the improved form of the dental clutch members; and Fig. 4 is a detail showing a portion of the dental members illustrated in Fig. 3, in their engaged position.

In Fig. 1 of the drawing there is illustrated a driving shaft 1 which may be the extended armature shaft of a starting motor not illustrated. A driving transmission member in the form of a sleeve 2 is slidably journalled on the shaft 1 and connected for rotation therewith by means of a pin 3 fixedly mounted in the shaft and engaging at its ends in axially extending slots 4 formed in the sleeve 2.

The sleeve 2 is provided on one end with inclined axial projections 5 meshing with similar projections 6 on an intermediate transmission member in the form of a coupling ring 7 which is journalled on a bearing sleeve 8, fixedly mounted in the end of the sleeve 2 as indicated at 8', and slidably journalled on a reduced extension 9 of the driving shaft 1. A pinion 10 is also slidably journalled on the reduced extension 9 of the driving shaft for movement into and out of mesh with an engine gear 11, and a driven transmission member in the form of a clutch ring 12 is fixedly mounted on the hub of the pinion as indicated at 13.

The adjacent faces of the coupling ring 7 and clutch ring 12 are formed with radially extending teeth 14, 15 respectively having substantially axially extending torque transmitting faces 14a, 15a and inclined intermediate surfaces 14b, 15b as best shown in Fig. 3 which provide an overrunning dental clutch connection therebetween. A sleeve 16 surrounds and encloses the coupling ring 7 and driven clutch ring 12, and is provided at one end with an inwardly directed flange 17 engaging a radial shoulder 18 on the end of the sleeve 2, while the other end of the sleeve 16 is formed with a retaining lip 19 for confining a thrust ring 21 in said sleeve in position to cooperate with a radial flange 22 on the driven clutch ring 12 to so confine the transmission members as to prevent disengagement of the inclined projections 5, 6 of the sleeve 2 and intermediate coupling ring 7 respectively while permitting sufficient lost motion between projections 5, 6 to allow the clutch teeth 14, 15 to disengage and permit pinion 10 to overrun. Torque transmitted through the coupling member thus causes the projections 5, 6 to wedge the overrunning clutch teeth 14, 15 together. A spring 23 normally holds the overrunning clutch teeth engaged, but permits them to disengage and allow the pinion 10 to overrun the starting motor when the engine becomes selfoperative.

Means for moving the pinion 10 into and out of mesh with the engine gear 11 is provided comprising a shift collar 24 arranged to be actuated by a fork member 25, and slidably mounted on the sleeve 2. Collar 24 is confined on the sleeve by a thrust ring 26, and a spring 27 is arranged to yieldably transmit axial movement of the collar 24 to the sleeve 2 in the direction to mesh the pinion 10 with the engine gear 11.

As best shown in Fig. 3, the advance edges 28 and 29 of the teeth 14, 15 of the overrunning clutch connection diverge radially in such manner as to cause the initial engagement to take place at their inner ends as indicated at 31 in Fig. 3. This radially divergent angle between the edges 28, 29 of the overrunning clutch teeth is made sufficient to ensure that the engagement of the teeth during overrunning is at their inner ends in spite of any slight looseness of the parts on the shaft 1. The necessary included angle has been found in practice to be in the range of two degrees to about three and a half degrees, the presently preferred angles in the commercial embodiment being 2° 12' on the ring 7, and one degree on the clutch ring 12, or a total included angle of 3° 12'. It will be understood that the angle illustrated in Fig. 3 of the drawing is exaggerated for the sake of clarity.

Referring now to Fig. 2 of the drawing, it will be seen that where the overrunning clutch teeth are made in the conventional manner with their advanced edges in a plane radial to the axis of the transmission, any slight cocking action permitted by the usual clearances of the parts on their bearings will cause the outer ends of the teeth to engage each other during overrunning. Since these points are at a substantial radial distance from the axis of the transmission, this intermittent engagement of the points of the teeth sets up the chattering action above referred to, with its undesirable consequences. It has been found that the beveling off of the engaging edges of the teeth as shown in Fig. 3 is effective in preventing the setting up of this chattering action.

Although the transmission described has been shown in a certain environment and form, it will be understood that the principles and structure involved are applicable to other environments without departing from the spirit of the invention as set forth in the accompanying claims.

I claim:

1. In engine starting gearing or the like a driving shaft, a driven member journalled thereon, and an overrunning clutch connection from the shaft to the driven member comprising a driving clutch member having radially extending teeth formed with substantially axially extending torque transmitting faces and inclined intermediate surfaces, a driven clutch member having similar teeth engageable therewith, yielding means urging the clutch members into engagement and means responsive to torque transmitted therethrough for clamping said clutch members together, said clamping means comprising members having sufficient lost motion to allow the clutch members to disengage and permit the driven clutch member to overrun the driving clutch member; said clutch members having the projecting edges of their teeth diverging axially from each other only sufficiently to insure that engagement of the teeth during overrunning takes place exclusively at their inner ends.

2. A transmission as set forth in claim 1 in which the diverging angle between the edges of the teeth of the dental clutch is in the range between two degrees and three and a half degrees.

References Cited in the file of this patent

UNITED STATES PATENTS

| | | |
|---|---|---|
| 2,644,562 | Pettus | July 7, 1953 |
| 2,782,643 | Miller | Feb. 26, 1957 |

FOREIGN PATENTS

| | | |
|---|---|---|
| 641,087 | France | Apr. 10, 1928 |